(12) United States Patent
Guenther

(10) Patent No.: US 12,043,805 B2
(45) Date of Patent: Jul. 23, 2024

(54) METHOD AND DEVICE FOR TREATMENT OF LIQUID HYDROCARBONS

(71) Applicant: Ecofuel Technologies LTD, St. Julian's (MT)

(72) Inventor: Thomas Andreas Guenther, Portals Nous (ES)

(73) Assignee: Ecofuel Technologies Ltd., St. Julian's (MT)

( * ) Notice: Subject to any disclaimer, the term of this patent is extended or adjusted under 35 U.S.C. 154(b) by 0 days.

(21) Appl. No.: 18/450,972

(22) Filed: Aug. 16, 2023

(65) Prior Publication Data

US 2023/0392081 A1 Dec. 7, 2023

Related U.S. Application Data

(62) Division of application No. 16/977,024, filed as application No. PCT/EP2018/064235 on May 30, 2018, now abandoned.

(30) Foreign Application Priority Data

Mar. 5, 2018 (AU) ................................ 2018201581

(51) Int. Cl.
| | |
|---|---|
| *B01J 19/24* | (2006.01) |
| *B01J 4/00* | (2006.01) |
| *C10G 29/04* | (2006.01) |

(52) U.S. Cl.
CPC .............. *C10G 29/04* (2013.01); *B01J 4/001* (2013.01); *B01J 19/243* (2013.01); *B01J 19/2465* (2013.01); *B01J 2219/00166* (2013.01); *B01J 2219/1946* (2013.01); *C10G 2300/202* (2013.01); *C10G 2300/4081* (2013.01)

(58) Field of Classification Search
CPC .............. C10G 29/04; C10G 2300/202; C10G 2300/4081; B01J 4/001; B01J 19/243; B01J 19/2465; B01J 2219/00166; B01J 2219/1946; B01F 27/2711; B01F 33/811
USPC ......................................................... 585/855
See application file for complete search history.

(56) References Cited

U.S. PATENT DOCUMENTS

2013/0251613 A1 9/2013 Hassan et al.

FOREIGN PATENT DOCUMENTS

| | | |
|---|---|---|
| CA | 774540 | 12/1967 |
| CH | 595432 | 2/1978 |

OTHER PUBLICATIONS

Final Office Action dated Mar. 17, 2023 issued in U.S. Appl. No. 16/977,024.
International Search Report and Written Opinion dated Oct. 30, 2018 for PCT/EP2018/064235.
Non-Final Office Action dated Jul. 29, 2022 issued in U.S. Appl. No. 16/977,024.

*Primary Examiner* — Huy Tram Nguyen
(74) *Attorney, Agent, or Firm* — Dorsey & Whitney LLC

(57) ABSTRACT

Disclosed is a method and a device for purification and desulfurization of liquid hydrocarbons, which, compared to sodium dispersion desulfurizing processes like already been disclosed, open up additional fields of application and greatly improves economy and achievable results.

20 Claims, 3 Drawing Sheets

METHOD AND DEVICE FOR TREATMENT OF LIQUID HYDROCARBONS

RELATED APPLICATIONS 000.1) This application is a divisional of U.S. patent application Ser. No. 16/977,024, titled Method and Device for Treatment of Liquid Hydrocarbons, filed Aug. 31, 2020, which is a U.S. National Stage filing under 35 U.S.C. 371 of International Patent Application No. PCT/EP2018/064235, titled Method and Device for Treatment of Liquid Hydrocarbons, filed May 30, 2018, which claims priority to Australian Patent Application No. 2018201581, filed Mar. 5, 2018, each of which is incorporated herein by reference in its entirety.

TECHNICAL FIELD

The invention relates to a method and a device for treatment of liquid hydrocarbons including purification and desulfurization of liquid hydrocarbons using metallic sodium.

BACKGROUND

To meet regulatory standards, liquid fuels must be purified and desulphurised, in some European countries (e.g. Sweden) legislation recently also set up limits for the amounts of aromatic hydrocarbon compounds contained in diesel fuels.

In refineries for decades Hydrogen-Desulfurization-Processes (HDS) have been used for purifying and desulphurising.

HDS processes are based on addition of hydrogen, use of Ni—Mo or Co—Mo catalysts and are carried out in high-pressure reactors.

Other methods applicable to purify and desulfurize liquid fuels are known but hardly used or still in research and development stage.

The Sodium Dispersion Desulfurization process (hereinafter referred to as SDD-Process) GB759283 (A) IPC C10G19/02, first published in 1952 by Kurt K. Rumpf and published by British Petroleum in 1956, is still not developed to industrial maturity and only found in special case application.

Until now the SDD-Process was considered uncompetitive compared to HDS processes because material costs for sodium were considered higher compared to hydrogen costs.

This, although higher considered costs for sodium compared to hydrogen costs are almost compensated by lower process costs, as the SDD-Process requires less process steps, no catalysts and no high pressure for desulfurization.

But in large petrochemical plants, where crude oil is processed into fuels and other by products, also hydrogen for desulfurization can be produced on site, that's why HDS systems had been preferred and developed over the years to the limit of feasibility.

In contrast, systems according to the SDD-Process method, have not yet been built and tested on industrial scale until now.

In order to meet the standards for transport fuel, reduction of sulphur to 50 ppm was mostly sufficient for gasoline and diesel by 2014.

Meanwhile, European, American and Australian fuel standards allow only 10 ppm sulfur content.

Although this excess amount of sulphur to be removed appears to be very small compared to the total amount of sulphur to be removed at the desulphurization process, it results in, that the amounts of hydrogen to be used in HDS processes and the required pressure ratios must be increased disproportionately.

This is caused by the fact, that sulphur compounds are integrated in hydrocarbon chains in very different structures (e.g. Mercaptans, Sulfides, Thiophenes, Alkylated Thiopenes, Thiphenols, Benzothiopenes, Dibenzothiopenes, etc.) resulting in, that some sulphur components are quite easy and others are very difficult to remove.

To achieve desulfurization grades lower 10 ppm the necessary amounts of hydrogen and the necessary pressure (process complexity) must be able to cope sulphur compounds of highest complexity, like e.g. dibenzothiopenes, which tend to predominate in the product at sulphur levels below 50 ppm.

With increase of sulphur component complexity, in HDS processes, expenses to remove sulphur increase disproportionately.

During the desulphurisation process, sulfur components that could not react despite supply of hydrogen and 40 bar pressure remain concentrated in the last ppm.

Only by drastic pressure increase up to 100 bar and strong increase of hydrogen quantities applicated a reaction can also be achieved with these components.

Caused by recently stricter fuel standards, now, much higher hydrogen amounts and more expensive catalysts are required, this, and the fact, that instead of 20-40 bar, now up to 100 bar of pressure are necessary to achieve reduction to 10 ppm, results in substancial cost increase in HDS processes.

By using the SDD-Process in a device like herewith disclosed, it has been shown, that only the use of a small additional, direct proportional amount of sodium and setting temperature to levels around 300° C. is sufficient to reduce sulphur from to below 10 ppm.

The cost advantage for the sulphur reduction that HDS process methods had over the SDD process methods is lost when a reduction of less than 10 ppm is required.

Caused by more restrictive fuel standards, now application possibilities open up where SDD-Process methods can be competitive or the more economical variant.

The SDD process, when carried out in method and equipment design disclosed herein, offers additional benefits.

Capital costs for construction of SDD plants are significantly lower than those for HDS plants due to less and simpler process steps.

In comparison to HDS plants, size or throughput capacity of SDD plants can be adapted to the volume requirements of smaller fuel production plants, which makes economically feasible on site cleaning and desulphurisation of products possible even for small decentralized located fuel production plants.

The SDD-Process, like it was first published in 1952, envisages removing sulphur from fuel products, reducing unpleasant odors and improving storage stability by using sodium dispersion.

However, in this former described form, the SDD-Process removes only a portion (predominantly mercaptans and sulfides) of the different sulphur components present in fuels.

The currently by law required desulfurization grades are not achievable, or only with huge, economically unsustainable dosages of sodium.

U.S. Pat. No. 3,166,492 discloses, that compare to previous process descriptions, desulphurisation results in the SDD-Process can be improved by adding organic halogen compounds, e.g. Bromobenzene.

The effectiveness of such additives is confirmed by various sides, but process expenses also increase considerably.

In the following, insights into the nature of sodium and sodium dispersions are described, which are directly related to the improvements resulting from the device presented here, compared to the prior art.

It is known that Sodium is suitable for reduction of impurities, oxides and sulphur components in liquid hydrocarbons, since it reacts with them forming reaction products that can easily be separated off.

However, if it is added to a liquid hydrocarbon only in solid or molten form, exploitable reaction surfaces remain very limited.

The process disclosed by Kurt K. Rumpf in 1952 therefore envisages dispersing sodium in a carrier oil prior to entering the process.

Melted and dispersed in oil in the described way, through formation of very fine metal particles, reactive surfaces are hugely increased.

Finestly dispersed, the reaction potential present in sodium can be much better exploited.

However, a produced sodium dispersion is not stable.

Immediately after production, dispersed sodium particles begin to segregate again, settle and deposit on top of each other.

Likewise, sodium particles are subject to an agglomerating effect, from which, referred to exploitability, even significantly greater disadvantages arise than from the demixing effect.

Especially the finest metal particles in the dispersion combine with each other immediately again when they deposit on top of each other or meet in the moving liquid.

The highest possible proportion of very fine particles exists only in the moment of dispersion production itself.

The agglomeration effect quickly destroys part of the ultra fine comminution in the dispersion.

The smallest particles are particularly affected by the agglomeration effect.

But the degree of effectiveness and exploitability of the sodium content for the treatment process is particularly determined by the amount of the finest particles.

Starting from the finest particles, the agglomeration effect starts immediately when finishing the dispersion preparation process and also concerns finest particles that have not settled but are in the flow of liquid.

The effective and exploitable reaction surface can already be reduced by 10-20% after a very short time.

Even if brought into the process only a few minutes after preparation, the sodium dispersion has already lost some of its potential reactivity and also later continuously loses reactivity through agglomeration throughout the treatment time.

For this reason, despite remarkable improvements in the exploitability of sodium through use of dispersions, still much higher than the necessary dosages have to be applied, when performing the method in the manner like known as state of the art.

SUMMARY

Method and device disclosed herein has been developed with the aim of providing a plant technology for a sodium treatment process which optimizes exploitation of sodium input and seeks to be economically operated in industrial dimensions.

Process steps "dispersion production" and "treatment of liquid hydrocarbons" are not carried out individually, they are carried out simultaneously in the same device.

The device is composed of a vessel, having attached a pressurizable pump- and dispersing circuit comprising of a pumping unit and a dispersing unit and a flow pipe and a throttle valve.

In the device the liquid hydrocarbons can circulate constantly through the pressurizable pump- and dispersing circuit at adjustable temperatures, adjustable pressure rates and adjustable residence time, which has shown unexpected effects in addition to the expectable effects like process simplification and energy savings.

The highest amount of finest sodium particles are provided not only in the moment of input of the sodium dispersion into the device, but are constantly produced and kept on best during entire treatment time.

In addition, reaction products formed during the treatment process, in which highly reactive ultra fine sodium particles may be locked in, will repeatedly torn open.

As a result, these, otherwise for reactions in the process lost ultra fine sodium particles, remain available for reaction.

Sodium can be introduced via pressure lock sluice directly into the device.

Sodium may be introduced into the device in solid form or in molten form.

If temperatures higher 100° C. are used for the treatment of liquid hydrocarbons, sodium, when introduced in solid form, immediately melts within the hot fluid and the melt enters and flow through the pressurizable pump- and dispersing circuit.

By passing through the pressurizable pump- and dispersing circuit, the liquid sodium metal is dispersed directly in the stream of the hydrocarbons to be treated.

The best achievable particle comminution arise exactly at the point where best possible reaction conditions are provided through high grade particle mixing, pressure, high shear and adjustable residence time, therefore the reactivity of ultra fine particles can immediately be exploited in the moment of there formation.

In contrast to carrying out the process in vessels with stirrer, tubular reactors, screw reactors or others, in which sodium dispersion amounts after having been entered are not further dispersed, in the apparatus described here, ultra fine dispersed sodium particles for optimized exploitation conditions of sodium, are formed and provided throughout the whole treatment time.

Advantages of the Disclosed Device Over Current State of the Art

Highest reactivity surface of the sodium is not only available in the beginning, it is kept up throughout the whole treatment time.

Due to effects of the "pressurized pump- and dispersing circuit" the necessary treatment time for purifying and desulfurization is clearly reduced.

It has been found, that when the through flowing hydrocarbons including dispersed sodium are pressurized in the pump- and dispersing circuit, and are kept under pressure for an additional time prior to enter back into the vessel, the exploitability of sodium increase and new fields of application open up.

To carry out combined reactions like desulphurization and reducing of aromatic compounds under pressure, only the pressurizable pump- and dispersing circuit, but not the entire device, must be designed according to higher pressure standards (PN)

As not expected effect was seen, that apart from purification and desulphurization with this device also contents of aromatic- and polyaromatic hydrocarbon compounds of middle distillates can be reduced substantially.

The necessary residence time of liquids to be treated, which in previously known embodiments of the process in reactors with stirrer, tubular reactors with long pipe lengths and slow liquid movements or others has to be set to 20-45 minutes to achieve satisfactory results, is only 5-20 minutes in the device disclosed here.

Sodium dispersion production as an additional process step is omitted.

Due to lower sodium consumption the process costs are significantly reduced compared to previously described process paths.

In addition to the improvements noted in cleaning and desulphurization processes, a new application field was found, high-boiling mineral oils can be split up in the device and converted into middle distillates.

The device disclosed in this application is based on the use of the SDD method, which is the state of the art since many years, but provides a plant technology showing significantly increased economic efficiency, significantly shorter treatment times, and new additional fields of application.

Furthermore this device is simply scalable and therewith can provide a basis for use of the SDD-Process method in industrial dimensions.

Compared to previous process ways, in the described device the same kind of cleaning results can be achieved quicker and with lower sodium consumption.

With the device, cleaning and desulfurization levels up to the limit of detectability can be achieved, contrary to treatment results described in the original form of the method, such as odor improvement, removal of certain impurities and partial removal of sulphur.

It was found that by use of the disclosed device sodium exploitability increases, reactivity accelerates, process time reduces, desulphurization levels up to the edge of detectability and reduction of aromatics can be achieved.

It was also noted that through the way the sodium dispersion is provided, and residence time and pressure of the liquids can be adjusted, also certain types of liquid hydrocarbons with boiling points above 400° C. (e.g. waste mineral oil) can be split up and converted into middle distillates at temperatures around only 320° C.

DETAILED DESCRIPTION

Figure 1:
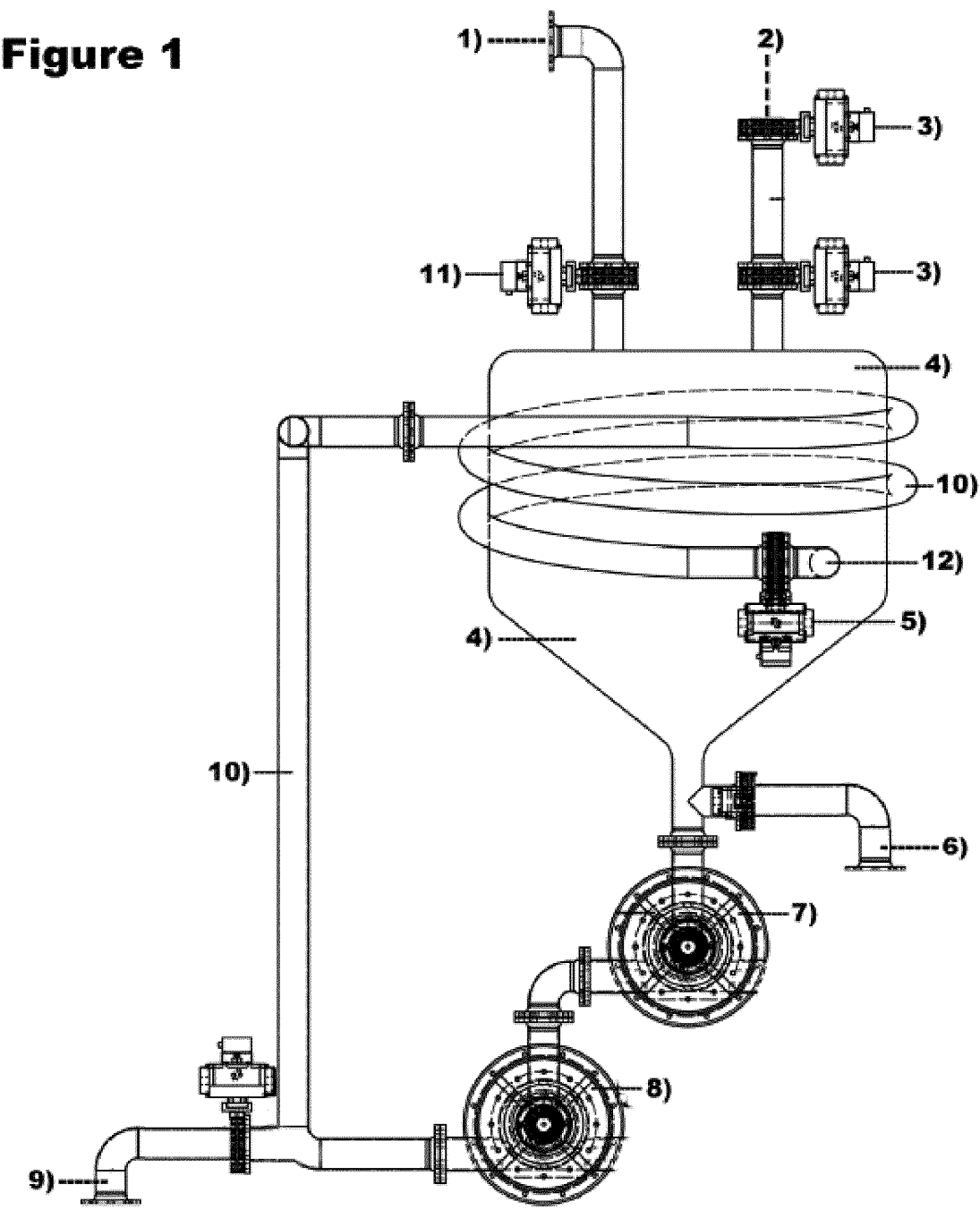
FIG. 1 is a side schematic view illustrating an example of a possible embodiment of the device with individual pumping and dispersing units wherein the presentation of heaters or heat insulation is omitted.
Figure 2:
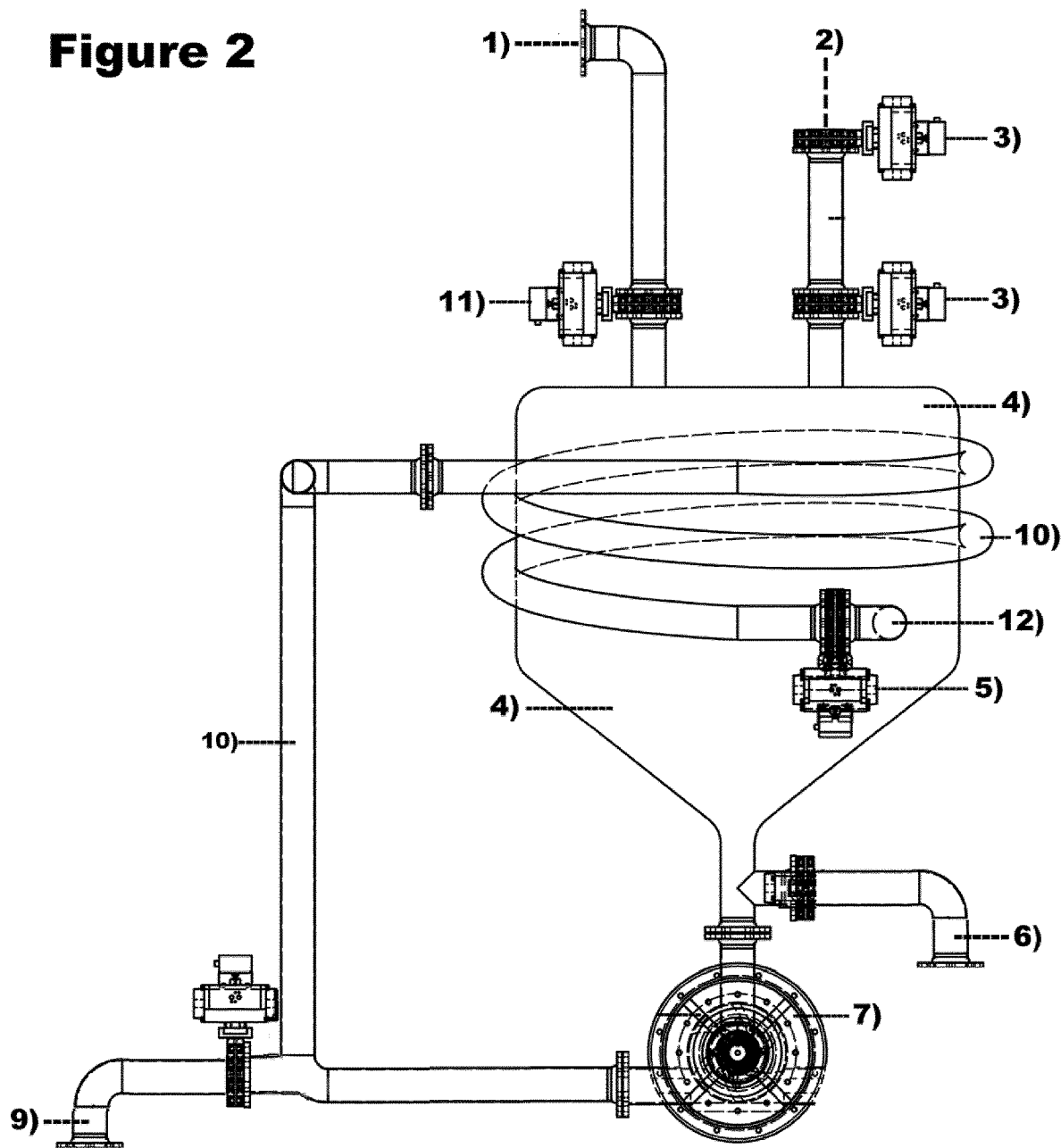
FIG. 2 is a side schematic view illustrating an example of a possible embodiment of the device with a combined pumping and dispersing unit wherein the presentation of heaters or heat insulation is omitted.
Figure 3:
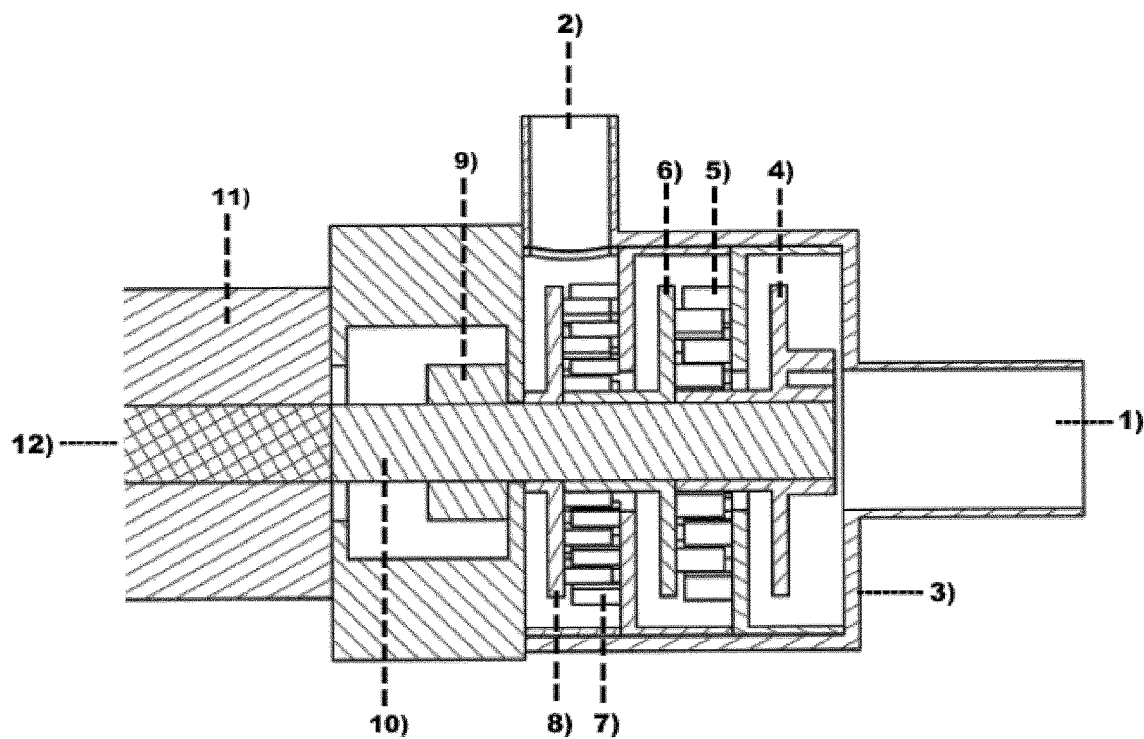
FIG. 3 is a side view schematic view illustrating an example of a possible embodiment of a combined pumping- and dispersing unit comprising of one pumping impeller and two rotor-stator-disperger modules mounted in line on the same shaft in the same casing.

Referring to FIG. 1, there is shown a device for sodium treatment of liquid hydrocarbons for the purpose of purification, desulfurization and reducing of aromatic compounds.

Liquid hydrocarbons, which should be anhydrous and preferably purified from coarse impurities and non-molecularly bound impurities, have to be introduced through entry 1) in liquid state into the vessel 4).

If not, or not sufficiently heated before being filled into vessel 4), the liquids should be heated in the vessel 4) to the desired treatment temperature before the sodium input.

From the moment the liquid hydrocarbons are circulating in the device through the pumping unit 7), the dispersing unit 8), the flow pipe 10) and the throttle valve 5) and liquid temperatures higher 100° C. are reached, sodium can be introduced through input sluice 2) into the vessel 4).

If in the device sulphur reduction of less than 10 ppm and/or reduction of aromatic hydrocarbon components is desired, fluid temperatures above 280° C. should prevail before entering the sodium through input sluice 2) into the vessel 4).

The hot fluid in the device then continuously flows from the lower part of the vessel 4) through pumping unit 7) through dispersing unit 8) through flow pipe 10) and through throttle valve 5), and is subjected to strong mechanical forces, high shear and adjustable pressure before returning at entry point 12) into vessel 4).

Once sodium is introduced through the input sluice 2) into the vessel 4), it melts immediately and enters the pump- and dispersing circuit 7)8)10)5)12) through which it then flows again and again.

The minimal, stoichiometric sodium amount required in ppm is equivalent to 1.5 times the ppm of the sulphur contained in the hydrocarbon liquid, but also depends on the treatment objective and possible other ingredients that could react with sodium.

Sodium may be introduced into the device in solid or liquid state via the sodium input sluice 2), located at the upper part of the vessel 4).

The entered sodium immediately participates in the circulation through the pump- and dispersing circuit 7) 8) 10) 5) 12) and is kept from this moment, together with the oil to be treated, continuously in circulation and dispersing state throughout the entire treatment time.

If oils in the range of middle distillate, boiling on from 160° C., are treated, vessel 4) has only to be kept under pressure of 4-6 bar, what is usually enough to maintain the oils in liquid state at treatment temperature, at 280° C.

By adjusting the flow rate in the flow pipe 10) by means of the throttle valve 5) located short before liquid return point 12) at vessel 4), the pressure created by pumping unit 7) can be kept or can be adjusted to a desired value, until fluids return to the vessel 4).

Depending on treatment target and amount of sodium entered through the sodium input sluice 2) into the vessel 4), the necessary treatment time of liquid hydrocarbons in the device can amount, from the moment of sodium input, between 2 and 120 minutes, but using optimal sodium amounts and optimal pressure adjustments a treatment time between 5 and 20 minutes is sufficient.

After treatment, the oil and reaction products can leave the device through outlet 6), located at the lower part of the vessel 4), or through outlet 9), located after dispersing unit 8) in the pump- and dispersion circuit.

To separate than reaction products from the liquid hydrocarbons, the liquids can be decompressed through valve 6) or valve 9) into a settling tank, into a centrifuge, or preferably into a distillation device, whereby heat previously supplied to the treatment process, can also be used for the distillation.

In an existing test device constructed according to the explanations of this application, comprising of a vessel with 40l capacity, a pumping unit of 1 m3/h flow capacity and 20 bar of pressure capacity, a disperser unit with flow capacity of 1 m3/h and a flow pipe of 100 mm diameter and length of 3 m, it was shown as one of many examples, that after subsequent separation of the reaction products from the liquid, a 15 minutes treatment of 30l diesel fuel, with initial 2300 ppm sulfur content and initial 21.2% content of aromatics (17.8% Mono-Aromatics and 3,5 Poly-Aromatics), resulted in remaining sulfur content in the diesel below 2 ppm and in remaining total aromatic content in the diesel of only 12.9% (10.7 Mono-Aromatics and 2.2% Poly-Aromatics).

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any known matter or any prior publication is not, and should not be taken to be, an acknowledgment or admission or suggestion that the known matter or prior art publication forms part of the common general knowledge in the field to which this specification relates.

While specific examples of the invention have been described, it will be understood that the invention extends to alternative combinations of the features disclosed or evident from the disclosure provided herein.

Many and various modifications will be apparent to those skilled in the art without departing from the scope of the invention disclosed or evident from the disclosure provided herein.

ASSIGNMENT OF THE NUMBERS IN "FIG. 1"

1) Entry for liquid hydrocarbons to be treated
2) Input sluice for sodium in solid or liquid state
3) Sodium input sluice pressure lock
4) Vessel
5) Throttle valve to adjust flow rate in pump- and dispersing circuit
6) Outlet for treated liquids and reaction products
7) Pumping unit
8) Disperser unit
9) Additional outlet for treated liquids and reaction products
10) Flow Pipe connecting dispersion unit and re-entry point into the vessel
11) Pressure lock of entry for liquid hydrocarbons to be treated
12) Entry point of returning liquid into vessel

ASSIGNMENT OF THE NUMBERS IN "FIG. 2"

1) Entry for liquid hydrocarbons to be treated
2) Input sluice for sodium in solid or liquid state
3) Sodium input sluice pressure lock
4) Vessel
5) Throttle valve to adjust flow rate in pump- and dispersing circuit
6) Outlet for treated liquids and reaction products
7) Combined Pumping- and Dispersing Unit
9) Additional outlet for treated liquids and reaction products
10) Flow Pipe connecting dispersion unit and re-entry point into the vessel
11) Pressure lock of entry for liquid hydrocarbons to be treated
12) Entry point of returning liquid into vessel

ASSIGNMENT OF THE NUMBERS IN "FIG. 3"

1) Entry for liquid hydrocarbons and melted sodium
2) Outlet for pressurized and dispersed liquid
3) Casing
4) Pumping impeller
5) Stator of first Rotor-Stator Module
6) Rotor of first Rotor-Stator Module
7) Stator of second Rotor-Stator Module
8) Rotor of second Rotor-Stator Module
9) High Temperature sliding ring seal
10) shaft
11) Bearing housing
12) Connection drive motor

The invention claimed is:

1. A method for treatment of liquid hydrocarbons, the method comprising:
providing liquid hydrocarbons from a hydrocarbon source to a heatable vessel through a first pressure lock inlet connected to the hydrocarbon source, the first pressure lock inlet located in an upper part of the vessel;
providing solid or molten metallic sodium from a sodium source to the vessel through a second pressure lock inlet connected to the sodium source, the second pressure lock inlet located in the upper part of the vessel;
flowing liquid out of the vessel through a pressure lock outlet located in a lower region of the vessel;
after flowing the liquid out of the vessel, flowing the liquid into at least one pumping unit to be pressurized, the at least one pumping unit forming at least a portion of a pressurizable pump;
flowing the liquid into at least one dispersing unit to be dispersed under pressure, the at least one dispersing unit forming part of a dispersing circuit;
after flowing the liquid into the at least one dispersing unit, flowing the liquid through a flow pipe and a throttle valve, the flow pipe connecting the at least one dispersing unit with a re-entry into the vessel, the throttle valve located before the re-entry into the vessel; and
adjusting a pressure generated by the at least one pumping unit, a flow rate of the at least one dispersing unit, and a flow rate of the throttle valve to set a residence time for the liquid in the flow pipe to be 2 seconds to 300 seconds.

2. The method of claim 1, wherein the at least one pumping unit is electronically adjustable by a frequency converter.

3. The method of claim 1, wherein the pressurizable pump and the dispersing circuit include a combined pumping and dispersing unit; and
wherein both flowing the liquid into the at least one pumping unit and flowing the liquid into the at least one dispersing unit includes flowing the liquid into the combined pumping and dispersing unit.

4. The method of claim 3, wherein the combined pumping and dispersing unit includes:
   at least one pumping impeller; and
   at least one rotor-stator-disperger-module mounted on the same shaft and located in the same casing.

5. The method of claim 4, further comprising rotating a disperger rotor of the at least one rotor-stator-disperger-module at a speed for optimal dispersion effect.

6. The method of claim 1, further comprising monitoring the pressure in the pressurizable pump and the dispersing circuit and the adjustments of the throttle valve with an electronic monitoring system, the electronic monitoring system configured to control and maintain adjustable pressure and flow rates within the pressurizable pump and dispersing circuit.

7. The method of claim 1, wherein providing solid or molten metallic sodium from the sodium source to the vessel includes providing metallic sodium at temperatures higher than 100° C.

8. The method of claim 1, wherein:
   providing the solid or molten metallic sodium from the sodium source to the vessel includes providing the metallic sodium at temperature higher than 240° C.;
   flowing the liquid into the at least one pumping unit to be pressurized includes pressurizing the liquid to 5 bar to 50 bar; and
   adjusting the pressure generated by the at least one pumping unit, the flow rate of the at least one dispersing unit, and the flow rate of the throttle valve includes adjusting the pressure generated by the at least one pumping unit, the flow rate of the at least one dispersing unit, and the flow rate of the throttle valve to set the residence time for the liquid in the flow pipe to be 15 seconds to 300 seconds.

9. The method of claim 1, wherein:
   providing the solid or molten metallic sodium from the sodium source to the vessel includes providing the metallic sodium at temperature higher than 280° C.;
   flowing the liquid into the at least one pumping unit to be pressurized includes pressurizing the liquid to 25 bar to 35 bar; and
   adjusting the pressure generated by the at least one pumping unit, the flow rate of the at least one dispersing unit, and the flow rate of the throttle valve includes adjusting the pressure generated by the at least one pumping unit, the flow rate of the at least one dispersing unit, and the flow rate of the throttle valve to set the residence time for liquids in the flow pipe between 30 seconds and 300 seconds.

10. The method of claim 1, wherein, at a moment of first providing the solid or molten metallic sodium from the sodium source to the vessel, a pressure inside of the pressurizable pump and the dispersing circuit is higher than 3 bar, temperatures are above 100° C., and the residence time for the flowing the liquid is adjusted to be 2 seconds to 300 seconds.

11. The method of claim 1, wherein, at a moment of first providing the solid or molten metallic sodium from the sodium source to the vessel, a pressure inside of the pressurizable pump and the dispersing circuit is higher than 3 bar, temperatures are above 100° C., and the residence time for the flowing the liquids is adjusted to be 10 seconds to 300 seconds.

12. The method of claim 1, wherein flowing the liquid into the at least one pumping unit to be pressurized includes pressurizing the liquid such that the liquid flowing into the at least one dispersing unit exhibits a pressure of 2 bar to 100 bar.

13. The method of claim 1, wherein flowing the liquid into the at least one pumping unit to be pressurized includes pressurizing the liquid such that the liquid flowing into the at least one dispersing unit exhibits a pressure of 10 bar to 40 bar.

14. The method of claim 1, wherein flowing the liquid into the at least one dispersing unit includes forming sodium particles exhibiting an average size below 2 microns.

15. The method of claim 1, wherein the pressure inside of the pressurizable pump and the dispersing circuit is higher than 15 bar, temperatures are above 240° C., and the residence time for the flowing the liquid is adjusted to be 15 seconds to 300 seconds.

16. The method of claim 1, wherein the pressure inside of the pressurizable pump and the dispersing circuit is higher than 20 bar, temperatures are above 280° C., and the residence time for the flowing the liquid is adjusted to be 30 seconds to 300 seconds.

17. The method of claim 1, wherein the pressure inside of the pressurizable pump and the dispersing circuit is higher than 15 bar, temperatures are above 240° C., and the residence time for the flowing the liquid is adjusted to be 30 seconds to 300 seconds.

18. The method of claim 1, wherein the pressure inside of the pressurizable pump and the dispersing circuit is higher than 30 bar, temperatures are above 320° C., and the residence time for the flowing liquids is adjusted to be 60 seconds to 300 seconds.

19. The method of claim 1, wherein adjusting the pressure generated by the at least one pumping unit, the flow rate of the at least one dispersing unit, and the flow rate of the throttle valve includes adjusting the pressure generated by the at least one pumping unit, the flow rate of the at least one dispersing unit, and the flow rate of the throttle valve to set the residence time for liquids in the flow pipe to be 40 seconds to 80 seconds.

20. A method for treatment of liquid hydrocarbons, the method comprising:
   providing liquid hydrocarbons from a hydrocarbon source to an upper part of a heatable vessel;
   providing solid or molten metallic sodium from a sodium source to the upper part of the vessel;
   flowing liquid out of a lower region of the vessel;
   after flowing the liquid and reaction products out of the vessel, flowing the liquid into at least one pumping unit to be pressurized, the at least one pumping unit forming at least a portion of a pressurizable pump;
   after flowing the liquid into at least one pumping unit, flowing the liquid into at least one dispersing unit to be dispersed under pressure, the at least one dispersing unit forming part of a dispersing circuit;
   after flowing the liquid into the at least one dispersing unit, flowing the liquid through a flow pipe and a throttle valve, the flow pipe connecting the at least one dispersing unit with a re-entry into the vessel, the throttle valve located before the re-entry into the vessel; and
   adjusting a pressure generated by the at least one pumping unit, a flow rate of the at least one dispersing unit, and a flow rate of the throttle valve to set a residence time for liquids in the flow pipe to be 2 seconds to 300 seconds.

* * * * *